United States Patent [19]

Sanders

[11] Patent Number: 4,625,560

[45] Date of Patent: Dec. 2, 1986

[54] CAPACITIVE DIGITAL INTEGRATED CIRCUIT PRESSURE TRANSDUCER

[75] Inventor: Gary G. Sanders, Lakewood, Ohio

[73] Assignee: The Scott & Fetzer Company, Cleveland, Ohio

[21] Appl. No.: 733,060

[22] Filed: May 13, 1985

[51] Int. Cl.[4] ............................................. G01L 9/12
[52] U.S. Cl. ...................................... 73/718; 331/65; 361/283
[58] Field of Search ................. 73/718, 724; 361/283; 331/65; 357/26

[56] References Cited

U.S. PATENT DOCUMENTS

| | | | |
|---|---|---|---|
| 3,397,278 | 8/1968 | Pomerantz | 73/724 |
| 3,932,792 | 1/1926 | Massie | 318/119 |
| 4,227,419 | 10/1980 | Park | 73/724 |
| 4,272,822 | 6/1981 | Yasuhara | 73/718 |
| 4,295,376 | 10/1981 | Bell | 73/724 |
| 4,392,383 | 7/1983 | Bauerlen | 73/724 |
| 4,398,426 | 8/1983 | Park | 73/724 |
| 4,415,948 | 11/1983 | Grantham | 361/283 |
| 4,420,790 | 12/1983 | Golke | 361/283 |
| 4,495,820 | 1/1985 | Shimada | 73/724 |

Primary Examiner—Donald O. Woodiel

Attorney, Agent, or Firm—Pearne, Gordon, Sessions, McCoy, Granger & Tilberry

[57] ABSTRACT

A highly accurate and miniaturized pressure transducer is disclosed which includes first and second capacitors as a part of the integrated circuit, which also includes an Eccles-Jordan astable multivibrator. The miniaturization of both the capacitors and the entire multivibrator circuit in an integrated circuit establishes all components so that they are very closely matched on the two halves of the multivibrator, and so that whatever environmental disturbances, e.g., electrical, thermal, noise, etc., are encountered, are shared by both halves, and hence negated, so far as output drift is concerned. The multivibrator has a rectangular wave output and the duty cycle thereof is proportional to the force or pressure applied. This duty cycle is changed upon applied pressure, which changes one of the capacitors, and measurement of the duty cycle is a measurement of the applied force or pressure. The entire output circuit of the transducer is a digital output to provide digital processing through to a digital display. The foregoing abstract is merely a resume of one general application, is not a complete discussion of all principles of operation or applications, and is not to be construed as a limitation on the scope of the claimed subject matter.

20 Claims, 5 Drawing Figures

CAPACITIVE DIGITAL INTEGRATED CIRCUIT PRESSURE TRANSDUCER

BACKGROUND OF THE INVENTION

Pressure or force transducers have been constructed in many different types. Generally, force transducers are pressure transducers, but not all pressure transducers are force transducers. Thus, the more general type is a pressure transducer, and is so designated herein. In utilizing a semiconductor such as silicon, three types of pressure transducers are currently in use: piezojunction, piezoresistive, and capacitive. Piezojunction transducers use the change in beta or the reverse junction $I_{cbo}$ to measure the change in pressure. These are highly sensitive, but extremely unstable, and therefore have seen little commercial development. Piezoresistive devices are currently in wide use and many devices are available. They use the stress-induced changes in silicon resistivity and tend to be reasonably stable, but are not particularly sensitive, i.e., about $10^{-5}$ volts/volt/torr is the theoretical limit, with about $5 \times 10^{-4}$ volts/volt/torr being the practical limit. Capacitive pressure transducers can be more sensitive by more than an order of magnitude and, if properly applied, are more stable than either piezo effect device type. Such semiconductor capacitive transducers are illustrated in U.S. Pat. Nos. 4,420,790 and 4,415,948.

Discrete capacitive pressure transducers currently enjoy wide acceptance as quality pressure transducers, and have even been applied toward the miniaturization of these pressure transducers. U.S. Pat. Nos. 3,397,278 and 4,415,948 also show a way of electrostatically bonding a silicon wafer to a glass plate in the forming of such pressure transducers. All pressure transducers, regardless of type, currently have analog outputs and utilize outboard analog-to-digital converters of varying types, if the device is to be coupled to a digital system. There is a type of pure digital pressure transducer presently available based on quartz technology. The disadvantages of the system are that one has to use quartz crystals in a bucking mode and they are very expensive systems.

The usual practical approach is the measurement of the changed capacitance based upon an AC parameter, i.e., the capacitance of a resonant tank circuit or the capacitance used in a divider or bridge configuration. The tank circuits are not widely used, due partly to the difficulties with precise control of the inductance. The change in capacitive impedance type has a variety of measurement techniques, with the simplest and most prone-to-error being the single-ended method. Differential and bridge measurement techniques are also used. In all of these methods, an AC driving waveform is utilized with DC resolution.

Another system currently used is a timed constant current charge and discharge cycle. This is utilized by primarily the dedicated digital capacitance meters, but is not applicable, due to distributed capacitance, to the small values of change of capacitance used in capacitance pressure transducers, e.g., $10^{-12}$ farads.

It has been suggested in some of the prior patents to utilize some digital processing of the signal, including a variable duty cycle, such as in U.S. Pat. Nos. 4,272,822; 4,227,419; and 4,398,426. Also, it has been suggested to utilize an astable multivibrator of the non-balanced type, as shown in U.S. Pat. Nos. 4,392,383 and 4,295,376.

SUMMARY OF THE INVENTION

The present invention is directed toward an entirely different method of measuring capacitance, i.e., by means of an Eccles-Jordan astable multivibrator. This circuit has a rectangular wave output and is capable of achieving a direct digital conversion of the output into a display of pressure in units-of-force per unit area, all without the need for intermediate A/D conversion circuitry, with its attendant errors and costs. However, in this invention, scaling is usually required for practical purposes. This multivibrator typically is a balanced, two-stage circuit, with each half contributing 180 degrees of phase shift for a regenerative 360 degrees total phase shift for oscillation. Since each stage has a saturated or near-saturated gain block, loop gain is very high, very many times greater than 1, and the output directly approximates a digital waveform. The accuracy of the multivibrator circuit is largely determined by the balance between the two symmetrical halves. The present invention achieves a high degree of accuracy by the matching of components in the multivibrator circuit, and by constructing the entire multivibrator circuit, including the two capacitors, one a reference, the other variable with pressure, all as a unitary integrated circuit on a semiconductor chip. A further advantage of this balanced circuit is that whatever environmental disturbances are encountered, e.g., electrical, thermal, noise, etc., they are shared between the two halves of the multivibrator, and thus negated, as far as output drift is concerned, tending to make the circuit self-compensating for such errors.

The Eccles-Jordan astable multivibrator, with its rectangular wave output, permits the all digital processing of the output signal, and the present invention includes a novel demodulating circuit wherein the duty cycle of the output wave is measured. Normally, such duty cycle is fifty percent with no pressure applied to the transducer, but with pressure applied, the capacitance of one of the two capacitors changes to decrease or increase the duty cycle, and this may be precisely measured and scaled so as to be presented in most any selected units of force-per-unit area for a pressure transducer.

Accordingly, the problem to be solved is how to construct a force or pressure transducer which will overcome the deficiencies of the prior art.

This problem is solved by a pressure transducer comprising, in combination, a semiconductor base, first and second capacitors each with first and second conductive plates and with each said first conductive plate integrally formed on said semiconductor base, said first capacitor at least partially formed on a deformable wall unitary with said semiconductor base, means to apply to said deformable wall a force or a pressure for measurement thereof by change of the distance and capacitance between said first and second plates of said first capacitor, an Eccles-Jordan astable multivibrator including said first and second capacitors, and an integrated circuit unitarily on said semiconductor base and including at least said multivibrator and said first and second capacitors.

The problem is further solved by a pressure transducer comprising, in combination, an Eccles-Jordan astable multivibrator including first and second capacitors, means to change the capacitance of one of the two capacitors in accordance with a change of pressure input, said multvibrator having a substantially rectangular wave output with a varying duty cycle of ON and OFF times in accordance with the capacitance change, high frequency means to establish plural high frequency pulses according to each of said ON and OFF times, counting means to count and determine the difference between the pulses in the ON and OFF times, and offset means to compensate for any initial departure of the duty cycle from fifty percent with no applied pressure or force.

This problem is further solved by a pressure transducer comprising, in combination, a semiconductor base, a deformable wall unitarily formed on said semiconductor base, a first capacitor with first and second conductive plates and with said first conductive plate mounted on one side of a substantially circular central area of said deformable wall, said deformable wall having an annular area surrounding said substantially circular central area, and the combination of said deformable wall central area and said first conductive plate establishing said first conductive plate as relatively stiff and inflexible relative to said annular area of said deformable wall.

Accordingly, an object of the invention is to utilize an Eccles-Jordan astable multivibrator in a pressure transducer.

Another object of the invention is to provide a pressure transducer wherein both capacitors of an Eccles-Jordan astable multivibrator and the entire multivibrator circuit are part of an integrated circuit on a silicon chip.

A further object of the invention is to provide a capacitive pressure transducer with a demodulator and with the pressure transducer and demodulator being an all digital circuit for digital processing of such output signal.

Other objects and a fuller understanding of the invention may be had by referring to the following description and claims, taken in conjunction with the accompanying drawing.

DESCRIPTION OF THE PREFERRED EMBODIMENT

Figure 1:
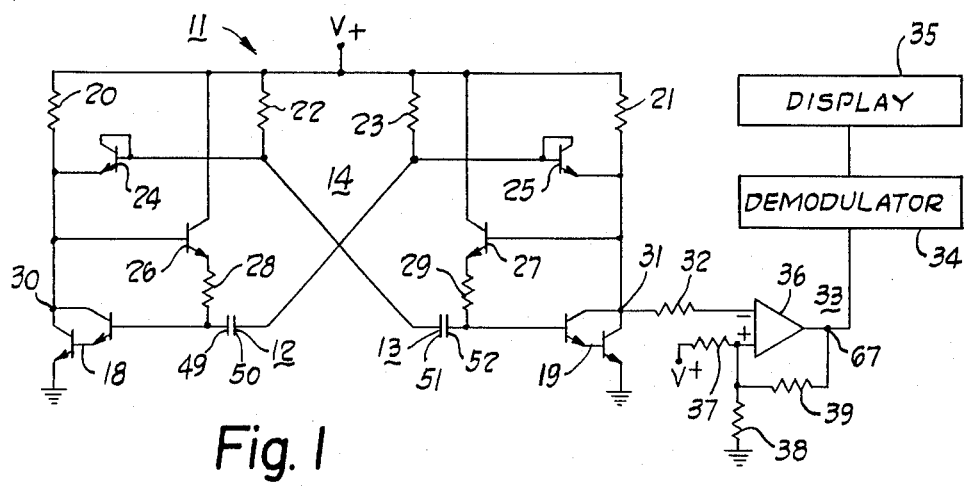
FIG. 1 is a schematic diagram of an astable multivibrator capacitive digital integrated circuit pressure transducer according to the invention.

A force or pressure transducer 11 is shown schematically in FIG. 1. Such transducer may be employed to measure force or pressure or change in distance, but will generally be referred to as a pressure transducer. This pressure transducer 11 includes first and second capacitors 12, and 13, respectively, as part of an Eccles-Jordan astable multivibrator 14. The first and second capacitors 12 and 13 and the entire multivibrator circuit 14 are formed as a part of an integrated circuit 15 shown in FIG. 2 on a semiconductor base such as a silicon chip 16. This astable multivibrator is nominally balanced, since it is of the Eccles-Jordan type. It includes generally first and second semiconductors 18 and 19, preferably high gain devices, and are shown as Darlington transistors. The Darlington transistors 19 and 20 illustrated in FIG. 1 are shown as Darlingtons to illustrate a way to obtain high gain, which is important toward obtaining a rectangular wave without rounded corners. Other means of achieving high gain may be utilized, such as super beta lateral PNP transistors or high transconductance FETs. The capacitors 12 and 13 are part of an RC timing circuit for the multivibrator circuit. The multivibrator circuit 14 includes first and second resistors 20 and 21 as load resistors each connecting the collectors of the transistors 18 and 19, respectively, to the positive supply voltage. The multivibrator circuit 14 includes further load resistors 22 and 23 each having one end connected to the positive supply voltage and each having the other end connected to the capacitors 13 and 12, respectively. Transistors 24 and 25 are connected as diodes, with the diode 24 connected to the lower ends of resistors 20 and 22, and diode 25 connected to the lower end of resistors 21 and 23. Emitter follower transistors 26 and 27 each have the base thereof connected to the lower end of resistors 20 and 21, respectively, and have collectors connected to the positive operational voltage. The emitter of transistor 26 is connected through a timing resistor 28 to the junction of a plate of capacitor 12 and the base of the transistor 18. The emitter of transistor 27 is connected through a timing resistor 29 to the junction of a plate of capacitor 13 and the base of the Darlington transistor 19.

The output from the multivibrator circuit 14 may be taken at either a terminal 30 or 31, at the collectors of the transistors 18 and 19, but in FIG. 1 is shown as taken at terminal 31 from the collector of the transistor 19. It is fed through a resistor 32 to a comparator circuit 33 and from there to a demodulator 34, and then to a display 35. The comparator circuit 33 includes a comparator 36 with input from the resistor 32 to the inverting input of this amplifier 36. The non-inverting input is connected to the junction of voltage divider resistors 37 and 38, which are connected between the positive supply voltage and ground. A positive feedback resistor 39 is connected from the output of the amplifier 36 to the non-inverting input. The comparator circuit 33 and the demodulator 34 may also be a part of the same integrated circuit 15, shown in FIG. 2.

Figure 2:
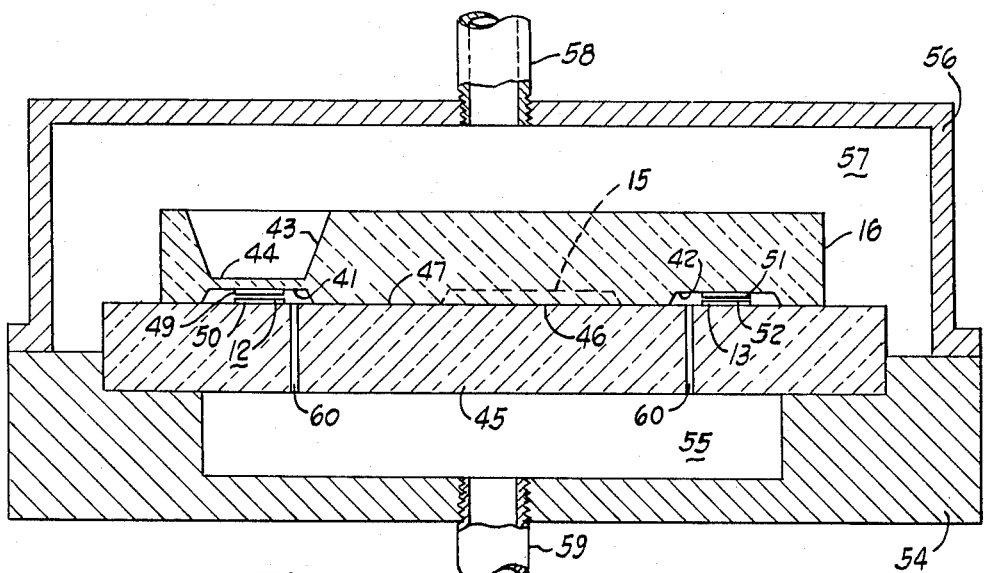
FIG. 2 is an enlarged sectional view through an integrated circuit incorporating two capacitors for the multivibrator.

In FIG. 2, the semiconductor base 16 would normally be made from silicon, in today's technology, with the integrated circuit 15 formed by any of a number of processes. Identical recesses 41 and 42 may be formed in the semiconductor base 16 in any desired manner, e.g., by etching. A recess 43 may be provided in the semiconductor base 16 from the opposite face, also by etching, so as to form a diaphragm 44 of an elastic or yieldable unitary wall. The semiconductor base 16 is secured to a base plate 45, and in the preferred embodiment this is a borosilicate glass with the planar face 46 of the semiconductor base 16 secured to the planar face 47 of the base plate 45 in a sealed manner. The preferred manner is to create a molecular type bond between the two by an electrostatic charge, such as is disclosed in U.S. Pat. Nos. 3,397,278 and 4,415,948. Before these two parts are secured together, the capacitors 12 and 13 are formed. The capacitor 12 has conductive plates 49 and 50, and the capacitor 13 has conductive plates 51 and 52. The depth of the recesses 41 and 42 determines the distance d between the pairs of plates. Suitable conductive leads are supplied to these conductive plates for connection to the multivibrator 14 in the integrated circuit 15. Means is provided to apply a force or a pressure to the diaphragm 44 so as to change the distance and the capacitance between the plates 49 and 50 of the first capacitor 12. In FIG. 2, this is represented by a housing base 54 sealed to the perimeter of the base plate 45 and defining a lower cavity 55. A housing cap 56 is sealed to the housing base and defines an upper cavity 57. Conduits 58 and 59 lead to the upper and lower cavities, respectively, and apertures 60 lead from lower cavity 55 to the recesses 41 and 42. By this means, a positive or negative pressure may be applied to the upper cavity and the lower cavity left open to the ambient, or so that differential pressure may be applied via the cavities to the capacitor 12.

The circuit of FIG. 1 operates as a balanced astable Eccles-Jordan multivibrator. First assume that the transistor 18 has just been turned on and transistor 19 has been turned off. This results in the collector of transistor 18 being about at ground potential, so that transistor 26 is turned off. This means no base drive for the transistor 18, and it would normally be off, except for the charge on plate 49 of capacitor 12. Thus, capacitor 12 and resistor 28 form the RC timing circuit for transistor 18. Conversely, with transistor 19 turned off, the collector thereof is at V+ and transistor 27 is saturated on. The capacitor plates 49 and 51 are about at ground potential because diode 24 and transistor 18 are turned on. Plate 50 will charge positively through resistor 23. With transistor 27 saturated on, plate 52 starts to charge positively through the timing resistor 29 from V+, starting from a negative charge on plate 52. When the capacitor plate 52 is charged positively enough, to the point where the voltage on the base of transistor $19 > 2V_{BE}$, the transistor 19 is turned on and quickly goes to saturation. This pulls the collector thereof down to about ground potential, and the capacitor plate 50 is also pulled down to ground potential through the diode 25. However, capacitor plate 49 is at a voltage negative of plate 50 by the amount of the supply voltage, and this large negative charge cannot be dissipated immediately, so it forces transistor 18 off.

The condition is now the reverse of that assumed initially, with transistor 19 on and transistor 18 off. This places the capacitor plates 50 and 52 at about ground potential because now diode 25 is on and transistor 27 is off. The capacitor plate 51 charges positively through resistor 22. With transistor 26 saturated on, the capacitor plate 49 starts to charge positively from the V+ through the timing resistor 28, starting from a negative potential. When the capacitor plate 49 gets positive enough, this turns on transistor 18 and it rapidly goes to saturation. This pulls the collector thereof and plate 51 down to ground. The negative charge on plate 52 relative to plate 51 now forces the transistor 19 off. Thus, the cycle is complete, and it continues in its astable vibrating mode so long as operating voltage is applied.

The multivibrator circuit 14 provides means to isolate the charging and discharging for each of the capacitors 12 and 13. This isolation means includes the diodes 24 and 25. For one-half of the circuit, for example, charging of plate 50 of capacitor 12 is through only the resistor 23, yet the discharge path is through diode 25 and Darlington 19 because of the way the diode 25 is poled. This squares the wave form by getting rid of the capacitive loading on the transistor 19.

One of the big advantages of the present invention is the fact that both the capacitors 12 and 13 and the entire multivibrator circuit 14 may be constructed as a part of an integrated circuit. This has the very great advantage of the matching of components so that the two halves of the multivibrator circuit are equal in value within about one part in $10^5$. If a discrete circuit were used, the components would be 1 or 2% off on matching, so that the present circuit is about one thousand times better on matching of components.

Another advantage of this balanced circuit is that whatever environmental disturbances, such as electrical, thermal, inherent noise, etc., may be encountered are shared between the two halves of the circuit, and thus negated, so far as output drift is concerned. In other words, the circuit tends to self-compensate the effects of any errors.

The period of each half of an astable multivibrator may be expressed as $$T = R_B C \ln \frac{E_{max}}{E_{max} - e_c}, \qquad (1)$$

where $E_{max}$ is the maximum potential across C (typically $2 \times V_c$) and $e_c$ is the dynamic operational potential across C as switching occurs (typically $V_c + V_{ce}$ sat). If two identical capacitors are integrated, one susceptible to $\Delta P$, termed $C_{\Delta p}$, the other fixed as a reference, termed $C_o$, to maintain circuit self-compensaion, then $\Delta T \alpha \Delta C \alpha \Delta P$, and the ratio of $T_{c\Delta p}/T_{c_o}$ will yield a relatively self-compensated indication of $\Delta P$.

The utilization of an integrated circuit for the astable multivibrator 14 results in close matching of components, as set forth above. This is desirable from the standpoint of having the circuit capable of balanced fifty percent duty cycle at the output terminal 31 so that the circuit will be both sensitive and accurate. Yet, this close matching of components makes it much more likely that both halves of the circuit will saturate upon power-up and the circuit will therefore not function. Discrete circuits depend upon small variations between devices to guarantee starting. Due to the small values of the capacitance of capacitors 12 and 13 and the small value of the change of capacitance on capacitor 12, the timing resistors 28 and 29 must be very large in order to achieve a frequency of operation sufficiently low that a highly accurate pressure transducer is achieved. The large values of resistance of resistors 28 and 29 will mean that the Darlington transistors 18 and 19, even though of very high gain, will need to operate at near their current starvation modes. For reasonable demodulation, the overall frequency of operation should be on the order of 1 kilohertz.

This circuit avoids the possibility of both transistors 18 and 19 saturating upon power-up, primarily by the use of the transistors 26 and 27. These operate to prevent saturation of both transistors 18 and 19, and this is best understood by assuming that both transistors 18 and 19 are saturated, even though this could not happen. If this were the case, the small voltage drops across the transistor junctions would have to be considered, for they are quite significant in the analysis of this circuit. Each collector would be at about 0.1 volt, referred to ground, and each base would be at about 1.3 volts if both transistors 18 and 19 were in saturation. The bases of the transistors 26 and 27 are thus at 0.1 volts, and the emitters of these transistors are at 1.3 volts, which means that these transistors are backbiased, so there is no bias to turn on these transistors. With transistors 26 and 27 turned off and no capacitor charge initially upon turn-on, there is no base drive to the transistors 18 and 19, so these transistors cannot be in saturation. Thus, with the transistors 26 and 27 present, the situation where both transistors 18 and 19 saturate at the same time is impossible. Accordingly, the multivibrator circuit 14 will always start, even though the components are very evenly matched.

In FIG. 1, the use of the Darlington transistors 18 and 19 provides a square wave output at the output terminal 31, with very little rounding off at the falling edge of the square wave because the transistors have a high Beta and because of diodes 24 and 25. The comparator circuit 33 still further squares off this output wave so that a nearly perfect square wave is submitted to the demodulator 34. This comparator 33 may be set to switch at, for example, a 2-volt input. To this end, the resistors 37 and 38 form a voltage divider, setting the point at which the amplifier 36 will switch and hence supply a square wave or rectangular wave to the demodulator 34.

Figure 4:
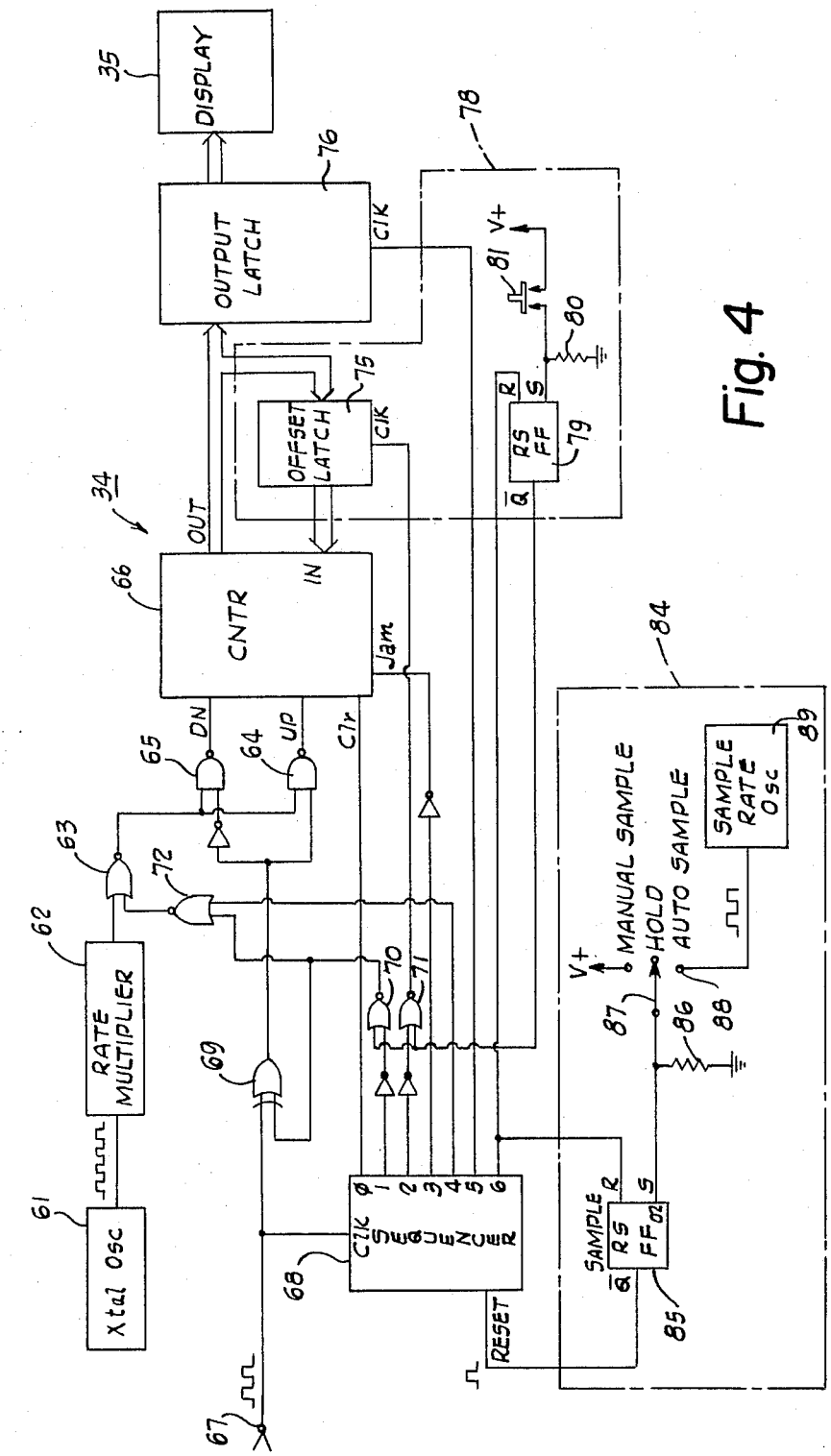
FIG. 4 is a block diagram of the demodulator portion of the circuit.

FIG. 4 is a block diagram of the demodulator circuit 34. An oscillator, such as a crystal oscillator 61, supplies a clock frequency of a square wave through a rate multiplier 62 to a NOR gate 63. From here it passes through NAND gates 64 and 65 to the up/down inputs of an up/down counter 66. The variable duty cycle rectangular wave signal is applied to an input terminal 67, from the comparator 33. This input signal is fed to the clock input of a sequencer 68, and also to an EX-OR gate 69. From here, it passes to another input of the NAND gates 64 and 65, with that to gate 65 being inverted. The sequencer has outputs zero through 6. The zero output goes to the clear input of the counter 66. The first and second outputs of the sequencer are inverted and go to NOR gates 70 and 71. The output of NOR gate 70 goes to an input of the EX-OR gate 69 and to an input of a NOR gate 72. The output of the NOR gate 71 goes to a clock input of an offset latch 75. The third output of the sequencer 68 is inverted and goes to the jam input of the counter 66. The fourth output goes to an input of the NOR gate 72 and the fifth output goes to the clock input of an output latch 76.

The demodulator 34 has an offset adjustment to adjust the circuit in case the duty cycle is not exactly fifty percent with no pressure applied to the capacitor 12. This offset adjustment circuit 78 includes the offset latch 75 and an RS flip-flop 79. The $\overline{Q}$ output of this flip-flop goes to an input of the NOR gates 70 and 71. The sixth output of the sequencer goes to the reset of this flip-flop, and the set input goes through a resistor 80 to ground, and also goes through a momentary normally open switch 81 to V+ to an external digital signal.

A display enable circuit 84 slows down the output sufficiently so that the display 35 may be observed by a human eye. If one duty cycle from the multivibrator 14 is in the order of 1 millisecond, it will be appreciated that this is too fleeting to be observed. The display enable circuit 84 solves this problem. This circuit 84 includes a sample RS flip-flop 85, with the $\overline{Q}$ going to the reset of the sequencer 68. The sixth output of this sequencer goes to the reset of this flip-flop 85, and the set input thereof is connected through a pull-down resistor 86 to ground, and also to the moving contact of a single-pole, triple-throw switch 87. When this switch is in the neutral center position, it is at a hold condition, and when moved up to the upper contact, it is connected to the positive supply voltage for a manual sample. When the switch 87 is moved to the lower contact 88, it leads to a sample rate oscillator 89, which has a square wave at a slow rate, e.g, one-tenth to 10 hertz.

Figure 5:
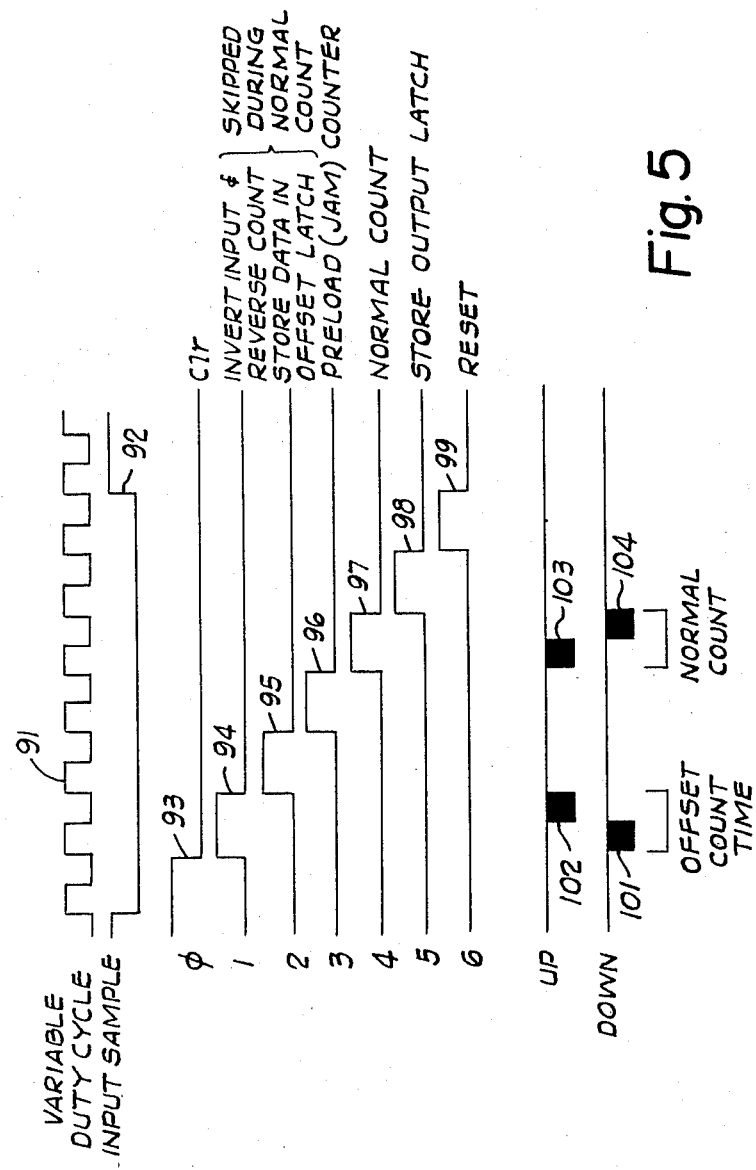
FIG. 5 is a timing diagram explaining the operation of FIG. 4.

FIG. 5 is a timing diagram illustrating the operation of the demodulator circuit of FIG. 4. Curve 91 is a graph of the rectangular wave input from the astable multivibrator 14, via the comparator 33, with a variable duty cycle. This would normally be substantially at fifty percent, with no pressure applied, and hence with the two capacitors 12 and 13 at the same value. Curve 92 shows the curve to obtain an input sample for one sequence of sequencer 68, as supplied by the sample rate oscillator, and this will be described below. The zero output from the sequencer 68 clears the up-down counter 66. The first and second outputs of the sequencer are skipped during the normal counting. They are used during the offset adjustment, and this is for the purpose of accommodating any deviation from exactly fifty percent duty cycle. This may occur due to slight mismatch of components or slight change in capacitance of the capacitor 12 during use, e.g., because of imperfect repositioning of the diaphragm wall 44. The clock oscillator 61 may operate at a high frequency, e.g., 10 megahertz, and be scaled by rate multiplier 62 so that the display will read in any desired unit of force-per-unit of area. The unit 62 is a rate multiplier, and one available rate multiplier is one which multiplies any value from 0.0001 up to 0.9999. Thus, this gives 9999 different scaling values, so that practically any value of force-per-unit area may be selected in a given system, such as the metric system or the English system. Merely by way of example, suppose the rate multiplier is set at 0.1000 and with a 10 megahertz clock frequency, this would be a scaled frequency of 1 megahertz. This would create 1000 pulses for each duty cycle on the input terminal 67. If the system were balanced, this would be 500 pulses in each of the ON and OFF times of this duty cycle.

The offset adjustment circuit 78 is so that during a time of no pressure on the diaphragm 44, one can adjust for other than fifty percent duty cycle. For example, the duty cycle might be 48%. When the momentary contact switch 81 is depressed, this enables the NOR gates 70 and 71, by a low on their inputs. As a sequence of variable duty cycle pulses come through the sequencer, the zero output of the sequencer clears the counter 66 as shown by curve 93 in FIG. 4. The sequencer outputs 1 through 6 have outputs shown by curves 94 through 99, respectively, in FIG. 4. In the above example, if the initial no-pressure condition is at a duty cycle of 48 percent, this means the ON time of the output voltage from multivibrator output terminal 31 will be 480 microseconds, and the OFF time will be 520 microseconds, for a total of 1 millisecond period of oscillation. When the offset adjustment switch 81 is momentarily depressed, $\overline{Q}$ on the flipflop 79 will go low, which enables the NOR gate 70, and this places a high input on the EX-OR gate 69 to invert the pulse train. This is done at the first output of the sequencer 68 and, since the pulse train is inverted, this would load 480 scaled high frequency pulses through NAND gate 65 into the down input of counter 66 and load 520 scaled high frequency pulses into the UP input. This is shown at portions 101 and 102, respectively, of the down and up count curves on FIG. 4. The second output of the sequencer 68 takes this output of the counter and stores it in the offset latch 75. This is a multiple channel output, e.g., 16 conductors for eventual four-digit display. This will be 520 up minus 480 down, or a 40 up count in counter 66 and clocked into latch 75. The third output of the sequencer jams this 40 up count from the offset latch into the counter 66. On the fourth duty cycle, the first output of the sequence is now low, so that the output of the NOR gate 70 is low, and the EX-OR gate 69 no longer inverts the pulse train. Hence, 480 scaled high frequency pulses are fed into the up input and 520 pulses into the down input of the counter 66. This will be a 40 down count, which is offset by the previously pre-set or jammed-in 40 up count, and hence the output of the counter 66 will be zero. This is the offset adjustment. When the sequencer 68 has its fifth output, this clocks the output latch 76, so that this zero count is fed to the display 35. On the sixth output of the sequencer 68, this resets the offset adjust flip-flop 79.

Now during normal count, when pressure is applied to the transducer 11, this will increase the capacitance of the variable capacitor 12 and the duty cycle might be increased to fifty-six percent, merely as an example. The zero output of the sequencer 68 clears the counter 66. Now with the offset adjustment momentary switch 81 not closed, the first and second outputs of the sequencer 68 are skipped because the $\bar{Q}$ output of the flip-flop 79 is now high to disable the NOR gates 70 and 71. On the third output of sequencer 68, the offset of a 40 up count is jammed into the counter 66. On the fourth output of the sequencer 68, this output goes high to drive the output of NOR gate 72 low, which enables the NOR gate 63, and the train of scaled high frequency pulses is then passed to the up and down counter inputs for one duty cycle. In the above example, this will be an up count of 560 pulses added to the pre-set or jammed count of 40 and a down count of 440, for a total up count of 160. The normal count of 560 up and 440 down is shown in the portions 103 and 104 of the up and down curves. This count of 160 up is clocked into the output latch 76 in the fifth output of the sequencer 68, and is passed to the display 35. This count of 160 in the above example is a reading of pressure expressed in some force units per some unit of area. If one wants this to correctly read in pounds-per-square-inch, the rate multiplier 62 may be set at some value other than 0.1000 so that the display reads properly in the selected units of force-per-unit of area.

Since the display is one which lasts only one millisecond, in the above example, it is too fast to be observed by the human eye. Therefore, the display enable circuit 84 permits one to slow down this output so that the display may be observed. If the switch 87 is moved to the upper position, which is the manual sample position, the sample flip-flop 85 is set and the $\bar{Q}$ output goes low, so that the sequencer 68 is not reset. Therefore, the counter 66 holds the preset count which is continuously displayed in the display 35. This may be a seven-segment digital display of four digits, the details of whch do not form a part of this invention.

The sample rate oscillator 89 operates at a low frequency, e.g., 1/10 to 10 hertz, and this might be 2 hertz as an example. When the switch 87 is moved down to the contact 88 for the auto sample mode, the flip-flop 85 is set for about one second, so that the count is passed to the display 35 for about one second. The sample rate is then 1 Hz.

Figure 3:
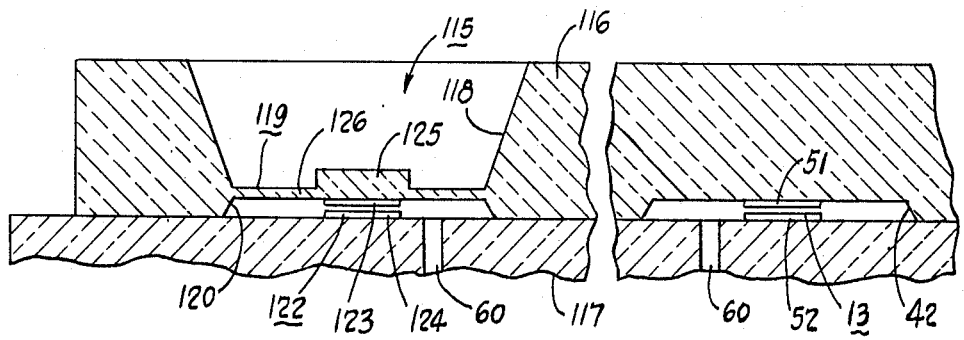
FIG. 3 is a further enlarged sectional view of a modification.

FIG. 3 illustrates a modified pressure transducer 115 and is an enlargement of the interior parts of the housing of FIG. 2. A semiconductor base 116 is sealed to a base plate 117, similar to the construction in FIG. 2. A recess 118 defines one face of a diaphragm or deflectable wall 119 and a recess 120 defines the other face of this deflectable wall. The deflectable wall is thus unitary with the semiconductor base 116. The first capacitor 122 has first and second plates 123 and 124, with the first plate 123 mounted on a central area 125 of the deflectable wall 119. The second plate 124 is mounted on the base plate 117 to be generally coextensive with and opposite the first plate 123. The combination of the first plate 123 and the central area 125 is thickened to be substantially thicker than the surrounding annular area 126 of the deflectable wall 119. The central area may be about three times as thick as the annular area 126 so that upon applied pressure and deflection of the deflectable wall 119, substantially only the annular area 126 deflects and the thickened central area 126 is relatively stiff. Making this relative thickness ratio about 3:1, the stiffness will be a ratio of about 13:1. The first and second capacitor plates 123 and 124 may be formed in the usual manner of deposition of aluminum film on the respective surfaces. In this preferred embodiment, the thickened central area 125 is achieved by etching or otherwise forming the recess 118 so that the annular area 126 is cut deeper into the semiconductor base 116 to form an annular moat area around a mesa area, which is the thickened central area 125. The aperture 60 permits the ambient or differential pressure to reach the recess 120. The modification of FIG. 3 would be normally mounted inside a housing just as the mounting for FIG. 2. The relative stiffness and rigidity of the thickened central area and plate 123 permit the plate 123 to stay substantially planar, and hence the linearity of the response to this pressure transducer is materially increased with changes in pressure.

The capacitance of a parallel plate capacitor is proportional to the area of the plates divided by the distance between the plates. The general formula is:

$$C = \frac{KA}{4\pi k d} \tag{2}$$

where C=capacitance, K=the dielectric constant depending upon the dielectric material, k=Coulombs constant, and d is the distance between the plates. The value of K for a vacuum is 1.0000 and for air is 1.0006. This formula holds where the area of the plate is large relative to the distance between the plates. This formula can be simplified to:

$$C = 8.842 \times 10^{-12} \frac{A}{d} \cdot K, \tag{3}$$

where C is in farads, and the dimensions are in mks.

The pressure transducer 11 or 115 utilizes the first and second capacitors 12 and 13 on the same semiconductor base as the integrated circuit of the astable multivibrator circuit 14. This achieves miniaturization, and more importantly achieves great uniformity in the relative values of the components so that the multivibrator circuit 14 is much more balanced than if it were constructed from discrete components. The capacitor 13 is a reference capacitor and capacitor 12 or 122 is that which varies in capacitance in accordance with some input variable such as force or pressure, and changes the distance between the plates 49–50 or 123–124. This change of capacitance changes the duty cycle of the output of this multivibrator 14, with this output being a rectangular wave for a digital output. The present invention provides an all digital output to process this wave through to a digital display 35.

With the capacitor 13 being a fixed reference capacitor, it is subject to the same environment, temperature, electrical and noise conditions as the variable capacitor 12 or 122, so that the accuracy and repeatability of the pressure transducer 11 are greatly enhanced over one constructed from discrete components. The use of the Eccles-Jordan circuit means that the astable multivibrator is inherently balanced.

The values of the components used in an actual circuit constructed in accordance with the invention are as follows:

| Values of Components | |
|---|---|
| Resistors | Capacitors |
| 20 33 Kohms | 12 30 pf |
| 21 33 Kohms | 13 30 pf |
| 22 33 Kohms | |
| 23 33 Kohms | |
| 28 40 megohms | Circuits |
| 29 40 megohms | 35 display |
| 32 22 Kohms | 36 op Amp LM 311 |
| 37 30.1 Kohms | 62 rate multiplier 74C167 |
| 38 20 Kohms | 63, 70, 71, 72 NOR gate 74C 02 |
| 39 1 megohm | 64, 65 NAND gate 74C 00 |
| 80 4.7 K | 66 counter 74C 192 |
| 86 4.7 K | 68 sequencer 74C 4017 |
| | 69 EXCL OR gate 74C 85 |
| Semiconductors | 75, 76 LATCH 74C374 |
| 18 Darlington NPN | 79, 85 RS FF 74C02 |
| 19 Darlington NPN | 89 oscillator LM 555 |
| 24 NPN | |
| 25 NPN | |
| 26 NPN | |
| 27 NPN | |

The demodulator circuit 34 is connected only to the output terminal 31 for the semiconductor 19; however, it could be connected to the outputs of either or both semiconductors 18 and 19. In the circuit as shown, it is connected to compare the duty cycle of the first and second semiconductors 18 and 19.

The transducer 11 or 115 has been termed a pressure transducer as a general term. With known modifications, this transducer may be used to measure force, acceleration, distance, or displacement, according to the desired end use.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A pressure transducer comprising, in combination: a semiconductor base;
first and second capacitors each with first and second conductive plates and with each said first conductive plate integrally formed on said semiconductor base;
said first capacitor at least partially formed on a deformable wall unitary with said semconductor base;
means to apply to said deformable wall a force or a pressure for measurement thereof by change of the distance and capacitance between said first and second plates of said first capacitor;
an Eccles-Jordan astable multivibrator including said first and second capacitors; and
an integrated circuit unitarily on said semiconductor base and including at least said multivibrator and said first and second capacitors.

2. A transducer as set forth in claim 1, wherein said multivibrator has a rectangular wave output, and means for all digital processing of the output of said multivibrator.

3. A transducer as set forth in claim 1, wherein said second capacitor is a fixed reference capacitor.

4. A transducer as set forth in claim 1, wherein said Eccles-Jordan multivibrator includes first and second semiconductors, with said first and second capacitors connected respectively thereto to control alternative conduction of the semiconductors.

5. A transducer as set forth in claim 4, wherein said first and second semiconductors are high gain transistors.

6. A transducer as set forth in claim 4, including demodulation means connected to compare the duty cycle of said first and second semiconductors.

7. A transducer as set forth in claim 6, wherein said demodulation means includes an up/down counter.

8. A transducer as set forth in claim 1, including means to isolate the charging and discharging of each of said capacitors.

9. A transducer as set forth in claim 8, wherein said isolating means includes diodes.

10. A transducer as set forth in claim 1, including demodulation means to obtain a digital output in terms of force per unit of area.

11. A transducer as set forth in claim 10, wherein said demodulation means includes means to obtain any of a plurality of rates of force per unit of area.

12. A transducer as set forth in claim 10, wherein said demodulation means includes scaling means to obtain any of a plurality of multipliers so that the force per unit area may be expressed directly in one of a plurality of systems.

13. A pressure transducer as set forth in claim 1, wherein one plate of said first capacitor is mounted on a thickened central area of said deformable wall.

14. A pressure transducer as set forth in claim 1, including a substantially circular raised mesa on said deformable wall, and said first plate of said first capacitor being mounted on said mesa.

15. A pressure transducer as set forth in claim 1, wherein said deformable wall has a thin substantially circular most surrounding a thickened central area in the order of three times the thickness of said deformable wall at said moat, and said first plate of said first capacitor being mounted on said thickened central area.

16. A pressure transducer comprising, in combination:
an Eccles-Jordan astable multivibrator including first and second capacitors;
means to change the capacitance of one of the two capacitors in accordance with a change of pressure input;
said multivibrator having a substantially rectangular wave output with a varying duty cycle of ON and OFF times in accordance with the capacitance change;

high frequency means to establish plural high frequency pulses according to each of said ON and OFF times;

counting means to count and determine the difference between the pulses in the ON and OFF times; and offset means to compensate for any initial departure of the duty cycle from fifty percent with no applied pressure or force.

17. A pressure transducer as set forth in claim 16, wherein said offset means includes means to operate said counting means in a reverse manner for one duty cycle.

18. A pressure transducer as set forth in claim 16, wherein said counting means includes:

a presettable up/down counter;

gate means having an output to the up and down inputs of said counter; and means to supply the ON and OFF time high frequency pulses of said variable duty cycle wave to said gate means.

19. A pressure transducer as set forth in claim 16, including scaling means to scale the output of said counting means to establish the pulse count thereof directly in selected units of force per unit of area.

20. A pressure transducer as set forth in claim 19, wherein said scaling means is a multiplier of a variable fraction times said high frequency means as applied to said counting means.

* * * * *

UNITED STATES PATENT AND TRADEMARK OFFICE
CERTIFICATE OF CORRECTION

PATENT NO. : 4,625,560

DATED : December 2, 1986

INVENTOR(S) : Gary G. Sanders, Lakewood, Ohio

It is certified that error appears in the above-identified patent and that said Letters Patent is hereby corrected as shown below:

Column 8, line 16, "up-down"
   should read as --up/down--

Column 10, line 18, "126"
   should read as --125--

Signed and Sealed this

Eleventh Day of August, 1987

Attest:

DONALD J. QUIGG

Attesting Officer     Commissioner of Patents and Trademarks